(12) United States Patent
Bohling et al.

(10) Patent No.: US 10,261,722 B2
(45) Date of Patent: Apr. 16, 2019

(54) PERFORMING CACHING UTILIZING DISPERSED SYSTEM BUFFERS

(71) Applicant: International Business Machines Corporation, Armonk, NY (US)

(72) Inventors: Neal E. Bohling, San Jose, CA (US); Roity Prieto Perez, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 15/004,652

(22) Filed: Jan. 22, 2016

(65) Prior Publication Data

US 2017/0212710 A1    Jul. 27, 2017

(51) Int. Cl.
G06F 13/14 (2006.01)
G06F 12/08 (2016.01)
G06F 3/06 (2006.01)
G06F 13/16 (2006.01)
G06F 12/0875 (2016.01)

(52) U.S. Cl.
CPC .......... *G06F 3/0656* (2013.01); *G06F 3/0605* (2013.01); *G06F 3/065* (2013.01); *G06F 3/067* (2013.01); *G06F 12/0875* (2013.01); *G06F 13/1642* (2013.01); *G06F 13/1673* (2013.01); *G06F 2212/452* (2013.01)

(58) Field of Classification Search
None
See application file for complete search history.

(56) References Cited

U.S. PATENT DOCUMENTS

| 7,337,281 | B2* | 2/2008 | Jin | G06F 3/0611 |
| | | | | 711/130 |
| 8,131,939 | B2 | 3/2012 | Palomar et al. | |
| 2012/0005431 | A1 | 1/2012 | Gross et al. | |
| 2013/0042070 | A1* | 2/2013 | Jalal | G06F 12/084 |
| | | | | 711/130 |
| 2014/0013053 | A1* | 1/2014 | Sawin | G06F 12/0873 |
| | | | | 711/122 |
| 2016/0070651 | A1* | 3/2016 | Shwartsman | G06F 12/0897 |
| | | | | 711/122 |
| 2017/0004083 | A1* | 1/2017 | Jain | G06F 12/0817 |

* cited by examiner

*Primary Examiner* — Ilwoo Park
(74) *Attorney, Agent, or Firm* — Zilka-Kotab, P.C.

(57) ABSTRACT

In one general embodiment, a computer-implemented method includes receiving at a first system a request for data, searching one or more local buffers within the first system for the requested data, determining whether the requested data is located within an additional buffer of an additional system in communication with the first system, in response to determining that the one or more local buffers within the first system do not contain the requested data, receiving the requested data by the first system from the additional buffer of the additional system, in response to determining that the requested data is located within the additional buffer of the additional system, and retrieving the requested data from a data disk within the first system, in response to determining that the requested data is not located within the additional buffer of the additional system.

16 Claims, 7 Drawing Sheets

PERFORMING CACHING UTILIZING DISPERSED SYSTEM BUFFERS

BACKGROUND

The present invention relates to buffering data, and more specifically, this invention relates to optimizing data buffering between shared systems.

Cached copies of data stored in a dedicated cache structure in a coupling facility often serve as a global repository for shared systems. However, this is achieved by performing double-buffering, which results in data that is buffered redundantly. This is inefficient, and can cause cache churn if multiple systems are all updating the same buffers simultaneously. Also, this does not scale well: as the number of shared systems increases, and the size of the buffers on each system increases, the cache needs of the dedicated cache structure in the coupling facility grow accordingly, putting strain on the coupling facility resources.

SUMMARY

A computer-implemented method according to one embodiment includes receiving at a first system a request for data, searching one or more local buffers within the first system for the requested data, determining whether the requested data is located within an additional buffer of an additional system in communication with the first system, in response to determining that the one or more local buffers within the first system do not contain the requested data, receiving the requested data by the first system from the additional buffer of the additional system, in response to determining that the requested data is located within the additional buffer of the additional system, and retrieving the requested data from a data disk within the first system, in response to determining that the requested data is not located within the additional buffer of the additional system.

According to another embodiment, a computer program product for sharing cached resources includes a computer readable storage medium that has program instructions embodied therewith, where the computer readable storage medium is not a transitory signal per se, and where the program instructions are executable by a processor to cause the processor to perform a method. The method includes receiving at a first system a request for data, searching one or more local buffers within the first system for the requested data, determining whether the requested data is located within an additional buffer of an additional system in communication with the first system, in response to determining that the one or more local buffers within the first system do not contain the requested data, receiving the requested data by the first system from the additional buffer of the additional system, in response to determining that the requested data is located within the additional buffer of the additional system, and retrieving the requested data from a data disk within the first system, in response to determining that the requested data is not located within the additional buffer of the additional system.

A system according to another embodiment includes a processor and logic integrated with and/or executable by the processor, where the logic is configured to receive at a first system a request for data, search one or more local buffers within the first system for the requested data, determine whether the requested data is located within an additional buffer of an additional system in communication with the first system, in response to determining that the one or more local buffers within the first system do not contain the requested data, receive the requested data by the first system from the additional buffer of the additional system, in response to determining that the requested data is located within the additional buffer of the additional system, and retrieve the requested data from a data disk within the first system, in response to determining that the requested data is not located within the additional buffer of the additional system.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for sharing cached resources. Various embodiments provide a method to utilize dispersed buffers of each system within a shared group of systems as a cache for enhanced data retrieval by the shared group of systems.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for sharing cached resources.

In one general embodiment, a computer-implemented method includes receiving at a first system a request for data, searching one or more local buffers within the first system for the requested data, determining whether the requested data is located within an additional buffer of an additional system in communication with the first system, in response to determining that the one or more local buffers within the first system do not contain the requested data, receiving the requested data by the first system from the additional buffer of the additional system, in response to determining that the requested data is located within the additional buffer of the additional system, and retrieving the requested data from a data disk within the first system, in response to determining that the requested data is not located within the additional buffer of the additional system.

In another general embodiment, a computer program product for sharing cached resources includes a computer readable storage medium that has program instructions embodied therewith, where the computer readable storage medium is not a transitory signal per se, and where the program instructions are executable by a processor to cause the processor to perform a method. The method includes receiving at a first system a request for data, searching one or more local buffers within the first system for the requested data, determining whether the requested data is located within an additional buffer of an additional system in communication with the first system, in response to determining that the one or more local buffers within the first system do not contain the requested data, receiving the requested data by the first system from the additional buffer of the additional system, in response to determining that the requested data is located within the additional buffer of the additional system, and retrieving the requested data from a data disk within the first system, in response to determining that the requested data is not located within the additional buffer of the additional system.

In another general embodiment, a system comprises a processor and logic integrated with and/or executable by the processor, where the logic is configured to receive at a first system a request for data, search one or more local buffers within the first system for the requested data, determine whether the requested data is located within an additional buffer of an additional system in communication with the first system, in response to determining that the one or more local buffers within the first system do not contain the requested data, receive the requested data by the first system from the additional buffer of the additional system, in response to determining that the requested data is located within the additional buffer of the additional system, and retrieve the requested data from a data disk within the first system, in response to determining that the requested data is not located within the additional buffer of the additional system.

Figure 1:
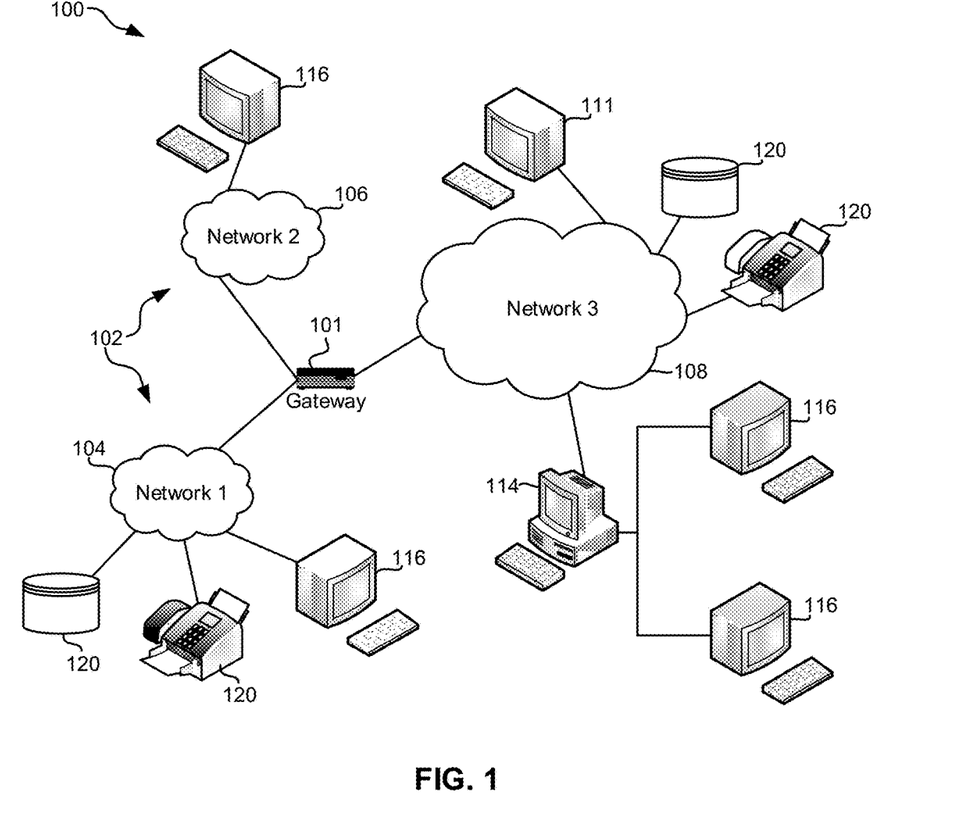
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
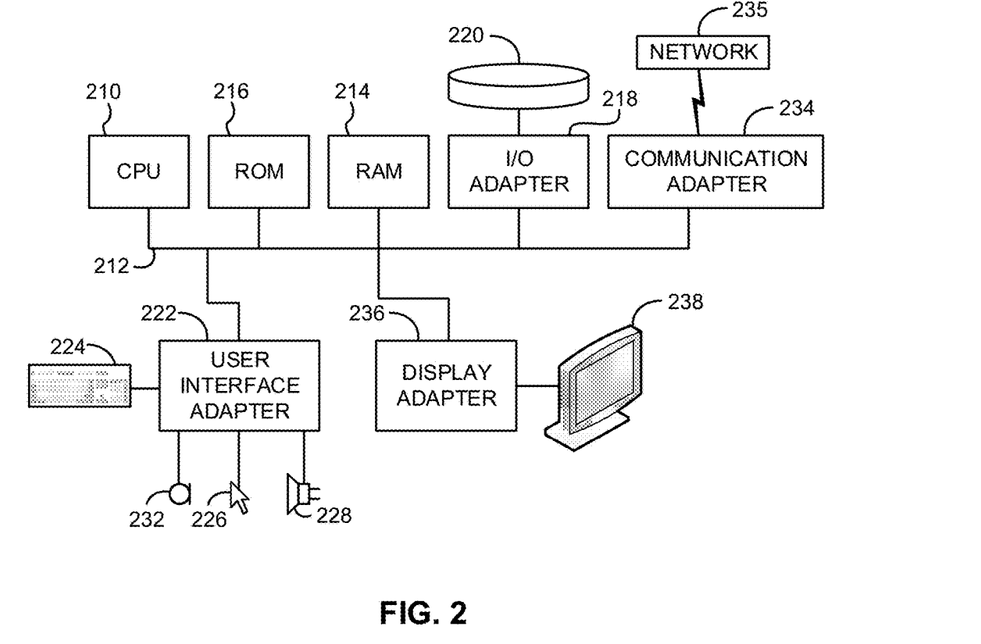
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
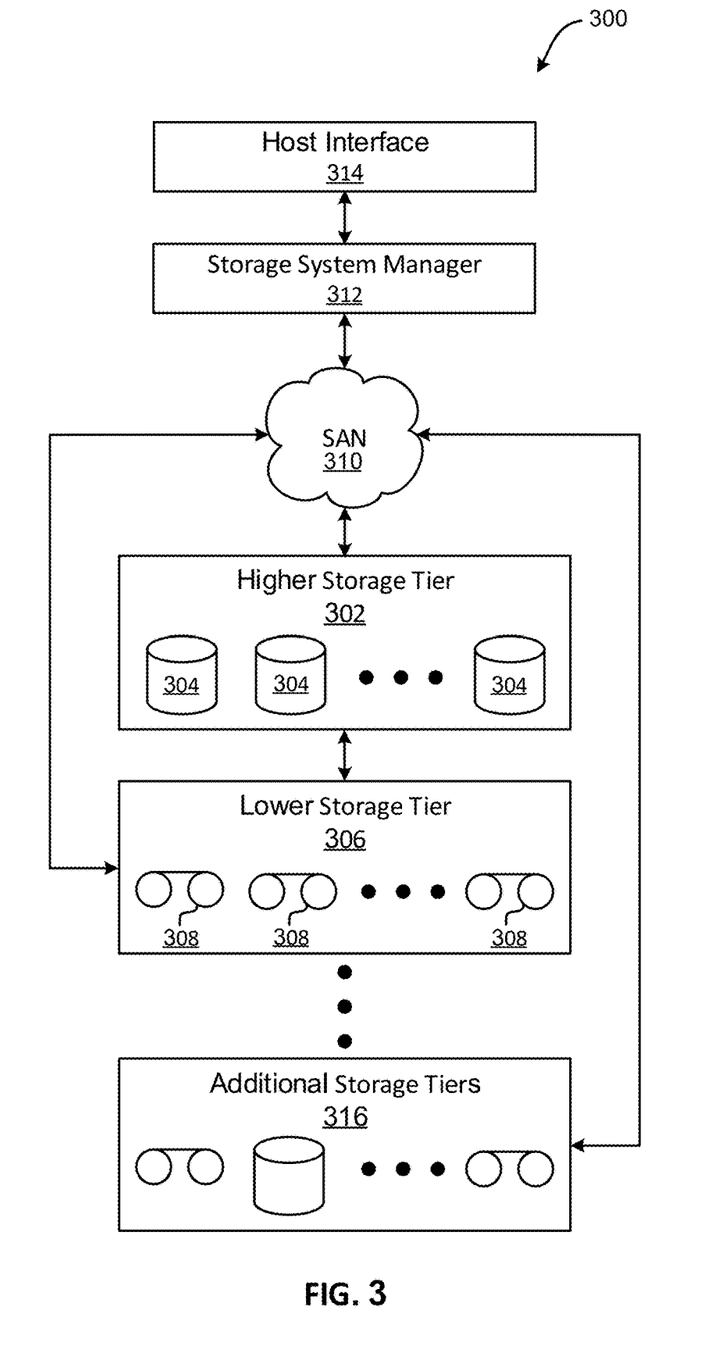
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
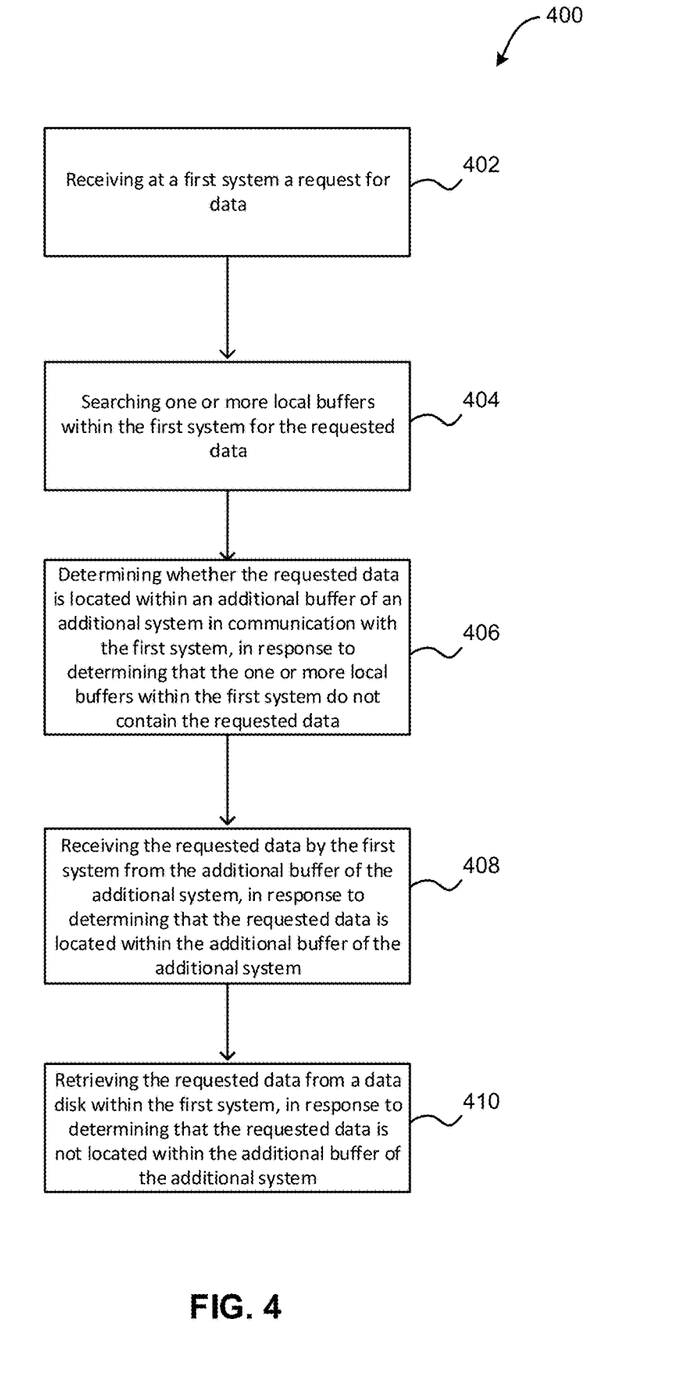
FIG. 4 illustrates a method for sharing cached resources, in accordance with one embodiment.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a request is received at a system for data. In one embodiment, the system may include a server (e.g., a mainframe server, etc.), a computer, a mobile computing device, or any other device capable of receiving requests for data. Additionally, in one embodiment, the request may be received from a system other than the receiving system. For example, the request may be received from a client system, a customer system, a separate server system, etc. Further, in one embodiment, the request for data may include a request to retrieve the data, a request to delete the data, a request to modify the data, etc. Further still, in one embodiment, the request for the data may be included within a transaction (e.g., a transaction that is processed by the system, etc.).

Additionally, in one embodiment, the request for the data may be received by the first system in association with a predetermined address space. For example, the request for data may indicate data located at a predetermined location within the predetermined address space. In another example, the address space may include a proprietary address space utilized by a plurality of systems including the first system that receives the request. For instance, the address space may include a proprietary address space utilized by a data sharing subsystem (e.g., an SMSVSAM subsystem, etc.), where the data sharing subsystem is implemented in conjunction with a plurality of systems including the first system that receives the request (e.g., a sysplex, etc.).

Further, as shown in FIG. 4, method 400 may proceed with operation 404, where one or more local buffers within the first system are searched for the requested data. In one embodiment, the one or more local buffers may include one or more caches physically located within the first system. For example, the one or more caches may temporarily store data in memory that is faster than other memory within the first system in order to enable faster serving of future requests. In another example, the one or more local buffers may include a cache memory location within a hardware processor of the first system, a cache memory location within a hard disk drive of the first system, etc.

Further still, as shown in FIG. 4, method 400 may proceed with operation 406, where it is determined whether the requested data is located within an additional buffer of an additional system in communication with the first system, in response to determining that the one or more local buffers within the first system do not contain the requested data. In one embodiment, the additional system may include one of a plurality of additional systems that provide one or more services as a group with the first system. For example, the plurality of additional systems and the first system are included within a sysplex (e.g., a parallel sysplex, etc.) and the plurality of additional systems and the first system may act together as a single system image. In another example, the plurality of additional systems and the first system may implement data sharing between each of the plurality of additional systems and the first system. In yet another example, the plurality of additional systems may implement parallel computing between the plurality of additional systems and the first system.

Also, in one embodiment, the plurality of additional systems may share one or more resources with the first system. For example, the plurality of additional systems and the first system may share one or more common time sources, global resource serialization (GRS) functionality allowing access to the same resources concurrently, a cross coupling facility (XCF) allowing the systems to communicate peer-to-peer, etc. In another embodiment, the first system may determine whether the requested data is located within the additional buffer of the additional system by communicating with one or more of the additional systems. For example, the first system may send a message (e.g., a request for the requested data, etc.) to one or more of the plurality of additional systems via a communications function such as a cross coupling facility (XCF) implemented within the grouping of systems.

In addition, in one embodiment, the additional system may check its additional buffer, in response to the request for the requested data from the first system. In another embodiment, the additional system may notify the first system as to whether the requested data is stored in its additional buffer. For example, the additional system may send a message to the first system indicating that the additional system contains the requested data, where the message is sent utilizing the communications function of the group of systems (e.g., the cross coupling facility (XCF), etc.). In yet another embodiment, the additional buffer of the additional system may include one or more caches physically located within the additional system.

Furthermore, as shown in FIG. 4, method 400 may proceed with operation 408, where the requested data is received by the first system from the additional buffer of the additional system, in response to determining that the requested data is located within the additional buffer of the additional system. In one embodiment, the additional system may send the requested data to the first system utilizing the communications function of the group of systems (e.g., the cross coupling facility (XCF), etc.).

Further still, as shown in FIG. 4, method 400 may proceed with operation 410, where the requested data is retrieved from a data disk within the first system, in response to determining that the requested data is not located within the additional buffer of the additional system. In one embodiment, the requested data may be retrieved from a portion of the data disk that does not include the one or more local buffers within the first system. For example, the requested data may be retrieved from one or more blocks of memory within the data disk of the first system that are not marked as cache blocks. In another embodiment, the data disk may include a physical data drive (e.g., a hard disk drive, etc.) physically located within the first system.

Also, in one embodiment, the requested data may be returned to a requesting system that sent the request (e.g., the system that sent the initial request for the data to the first system, etc.). In another embodiment, after returning the requested data to the requesting system that sent the request, the requested data may be stored within one or more of the local buffers within the first system. In yet another embodiment, after returning the requested data to the requesting system that sent the request, the requested data may be stored within a buffer of one of the plurality of additional systems instead of within the first system. For example, it may be determined that the one or more local buffers within the first system are full or have less than a predetermined storage capacity available, and in response to such determination, the requested data may be sent to one of the plurality of additional systems for buffer storage.

Additionally, in one embodiment, the first system may search one or more local buffers within the first system for the requested data when it is determined that the first system has the resources (e.g., the processing resources, the storage resources, etc.) to handle the request. In another embodiment, the first system may send the request for data to one or more of the plurality of additional systems when it is determined that the first system does not have the resources to handle the request. For example, the first system may forward the request to one or more of the plurality of additional systems utilizing the communications function of the group of systems (e.g., the cross coupling facility (XCF), etc.).

In this way, in one embodiment, buffers of each system may function as a cache for use by all systems within a group, which may eliminate a need for an independent cache structure. Additionally, in one embodiment, buffers available to the group may increase as additional systems are added to the group.

Figure 5:
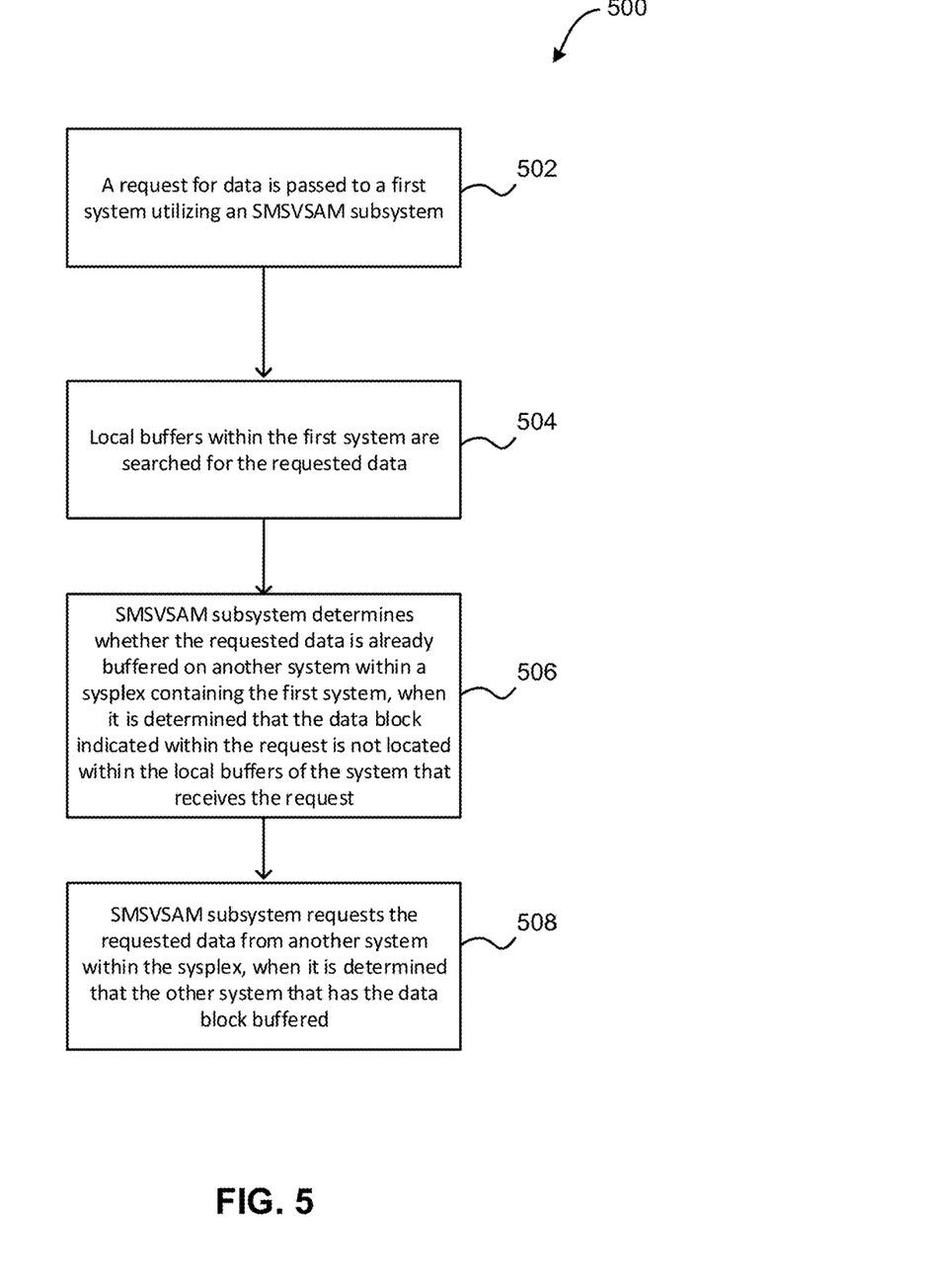
FIG. 5 illustrates a method for handling a data request, in accordance with one embodiment.

Now referring to FIG. 5, a flowchart of a method 500 for handling a data request is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a request for data is passed to a first system utilizing an SMSVSAM subsystem. For example, the request for data may be made to an address space implemented by the SMSVSAM subsystem. Additionally, method 500 may proceed with operation 504, where local buffers within the first system are searched for the requested data. For example, a data block indicated within the request for data may be searched for within the local buffers of the system that receives the request. Further, method 500 may proceed with operation 506, where the SMSVSAM subsystem determines whether the requested data is already buffered on another system within a sysplex containing the first system, when it is determined that the data block indicated within the request is not located within the local buffers of the system that receives the request.

Further still, method 500 may proceed with operation 508, where the SMSVSAM subsystem requests the requested data from another system within the sysplex, when it is determined that the other system that has the data block buffered. In one embodiment, the SMSVSAM subsystem may buffer the requested data at the one of the local buffers within the first system, after receiving the requested data from the other system within the sysplex. In another embodiment, the SMSVSAM subsystem may not buffer the requested data at the one of the local buffers within the first system, and may allow the other system to maintain the requested data in its buffer, after receiving the requested data from the other system within the sysplex. In still another embodiment, the SMSVSAM subsystem may buffer the requested data at the one of the buffers of another system within the sysplex, after receiving the requested data from the other system within the sysplex, when it is determined that local buffers are full, but buffers on the other system within the sysplex have adequate space.

Figure 6:
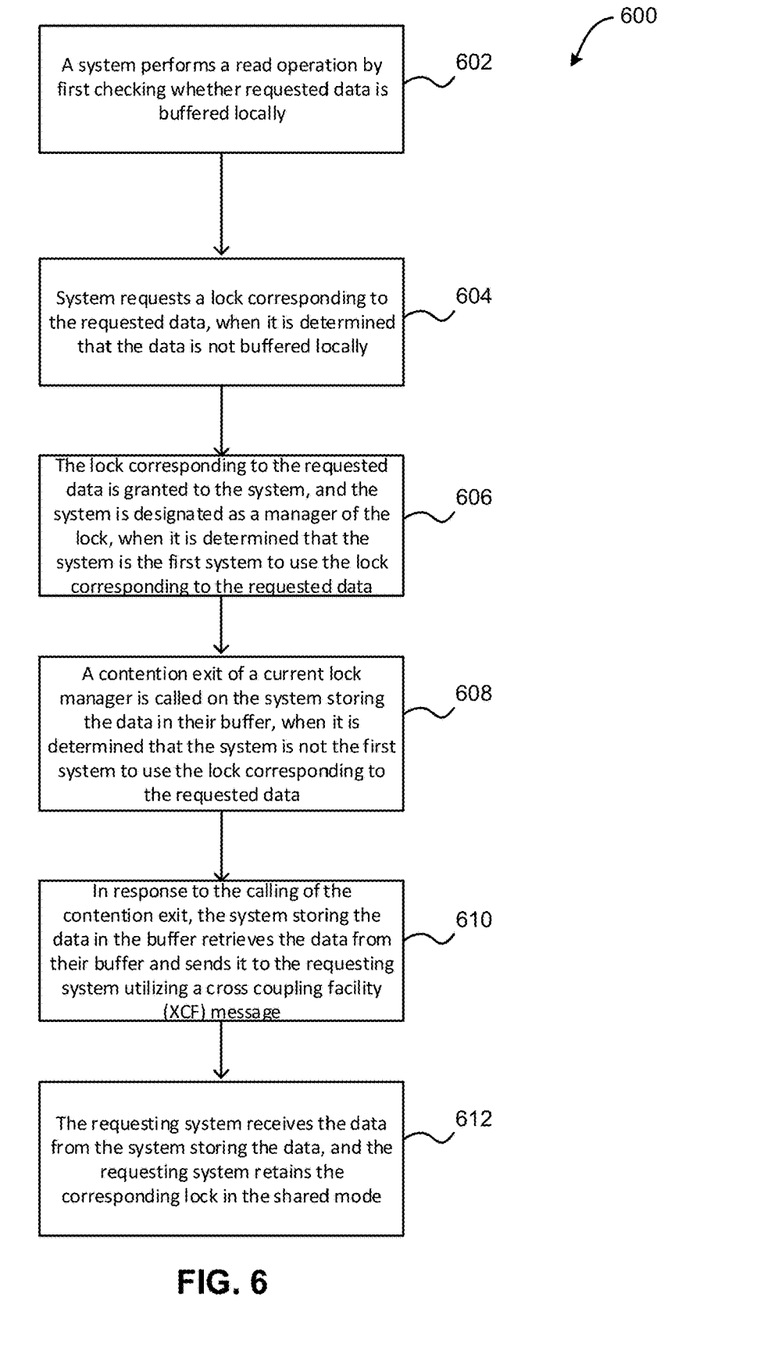
FIG. 6 illustrates a method for handling a data request utilizing a lock structure, in accordance with one embodiment.

Now referring to FIG. 6, a flowchart of a method 600 for handling a data request utilizing a lock structure is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a system performs a read operation by first checking whether requested data is buffered locally. In one embodiment, the system may check one or more buffers within the system to determine whether they contain the requested data. In another embodiment, the requested data may be represented by a data block. Additionally, method 600 may proceed with operation 604, where the system requests a lock corresponding to the requested data, when it is determined that the data is not buffered locally. In one embodiment, the system may request a lock in a shared mode.

For example, a coupling facility lock structure may be used to track which systems have which data sets buffered. In another example, each lock inside the structure may represent a single block (e.g., a block stored within a VSAM data as a control interval (CI), etc.) of data that is buffered. In yet another example, a key associated with each lock may include one or more of a data set identifier (e.g., a data set name, etc.) and a relative block number (e.g., an RBA or CI number, etc.). In still another example, when a system buffers a block during a read operation, the system may obtain a corresponding lock in a shared mode. In one embodiment, a plurality of systems within a group may obtain the corresponding lock in the shared mode, and any time one of the systems stores a local copy of the requested data, the system may obtain the shared lock, which may be held until the buffer storing the local copy of the requested data is released.

Further, method 600 may proceed with operation 606, where the lock corresponding to the requested data is granted to the system, and the system is designated as a manager of the lock, when it is determined that the system is the first system to use the lock corresponding to the requested data. In one embodiment, when the system is designated as the lock manager, the system may then be aware that no other systems within the group currently have the requested data buffered, and the system may then issue an input/output (I/O) operation to retrieve the data from a hard disk drive of the system.

Further still, method 600 may proceed with operation 608, where a contention exit of a current lock manager is called on the system storing the data in their buffer, when it is determined that the system is not the first system to use the lock corresponding to the requested data. For example, the current lock manager may include the first system to buffer the requested data. Also, method 600 may proceed with operation 610, where in response to the calling of the contention exit, the system storing the data in the buffer retrieves the data from their buffer and sends it to the requesting system utilizing a cross coupling facility (XCF) message. In one embodiment, the system storing the data in the buffer may be made aware that another system is interested in the buffered data in response to the calling of the contention exit.

Also, method 600 may proceed with operation 612, where the requesting system receives the data from the system storing the data, and the requesting system retains the corresponding lock in the shared mode. In one embodiment, depending on a user setting, the buffer on the requesting system may then be freed and the lock released, which may prevent further redundancy of the data. In another embodiment, this may ensure that only the first system to read the data holds the data in buffer, and all others must then get it from that system. In yet another embodiment, this may relieve a storage requirement as the buffer is only then stored once in the PLEX, rather than once per-system. In still another embodiment, this functionality may be enabled with certain usage thresholds or on a data set by data set basis.

In addition, in one embodiment, when a system wants to update and write a buffer, it may get the corresponding lock in an exclusive mode. This may generate contention, and one system (designated the lock manager) may be notified via a contention exit. In another embodiment, the code for this exit may then notify the other shared lock holders, and they may all release their copy of the buffer and release the shared lock. In still another embodiment, after all systems that hold the lock as shared release the lock, the system doing the update may continue. In another embodiment, once the write is finished, the exclusive lock may be released, and the shared lock may be obtained by the system since the buffer is now stored on that system. In this way, an amount of storage needed on a coupling facility of a group of systems may be greatly reduced, and buffer redundancy may be limited.

Figure 7:
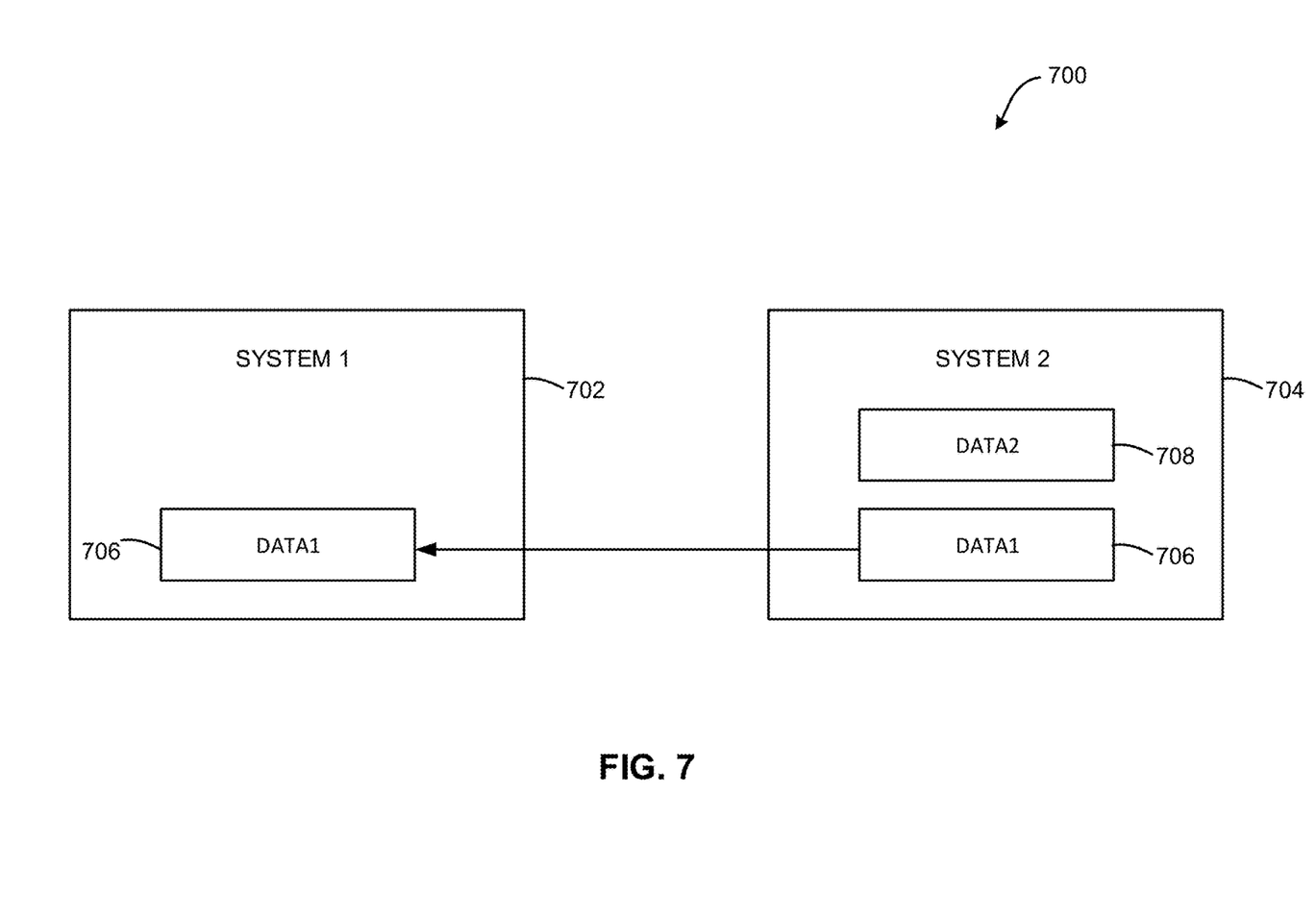
FIG. 7 illustrates an exemplary dispersed buffer environment, in accordance with one embodiment.

FIG. 7 illustrates an exemplary dispersed buffer environment 700, in accordance with one embodiment. As shown in FIG. 7, the exemplary dispersed buffer environment 700 includes a first system 702 and a second system 704. In one embodiment, both the first system 702 and the second system 704 may be included within a sysplex. Additionally, the second system 704 includes first buffered data 706 and second buffered data 708. Further, the first system 702 obtains the first buffered data 706 from the second system 704. In one embodiment, the first system 702 may obtain the first buffered data 706 from the second system 704 by requesting the first buffered data 706, where the request is sent in response to the first system 702 receiving a request for data (e.g., a GET request, etc.) and determining that the data does not currently exist in local buffers of the first system 702.

Additionally, in one embodiment, a DFSMS VSAM RLS System Cache Manager (SCM) sub component may interface with SMSVSAM address space on the first system 702 and the second system 704, instead of interfacing with one or more cache structures. In another embodiment, a GET request for data may first go to a local buffer of the first system 702. If the data is not in the buffers, it will then search the cache structure of the second system 704. If it is not there, then it will do a read from disk of the first system 702. In this way, buffers of systems in a sysplex may be relied upon to provide data instead of a cache structure in a coupling facility, which may reduce a load on the coupling facility.

Further, in one embodiment, redundant buffering may be avoided by allowing each system in a sysplex to function as a cache layer for other systems in that sysplex. For example, when a local system is seeking a buffer, it may poll the other systems in the sysplex rather than polling the cache structure. In this way, additional systems and larger buffers may provide additional local data storage without placing additional load on coupling facility cache structures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    receiving, at a first system, a request for data, where the first system includes a first server containing a first central processing unit physically located within the first system, a plurality of first caches physically located within the first system, and a first disk drive physically located within the first system;
    searching the plurality of first caches physically located within the first system for the data, where the plurality of first caches include a cache memory location within the first central processing unit and a cache memory location within the first disk drive; and
    in response to determining that the plurality of first caches physically located within the first system do not contain the data:
        identifying a second system physically separate from the first system, where the second system includes a second server, separate from the first server, containing a second central processing unit physically located within the second system, a plurality of second caches physically located within the second system, and a second disk drive physically located within the second system,
        requesting a lock for the data from a coupling facility lock structure, where:
            each lock within the coupling facility lock structure represents a single block of data buffered by the first system, the second system, or another system within a predetermined group of systems,
            a key associated with each lock includes a data set identifier and a relative block number, and
            in response to the second system storing a local copy of the data in the plurality of second caches physically located within the second system, the second system obtains the lock until the data is released from the plurality of second caches of the second system,
        receiving an indication as to whether the second system includes the data in the plurality of second caches physically located within the second system, where the plurality of second caches include a cache memory location within the second central processing unit and a cache memory location within the second disk drive, and where:
            receiving the indication that the data is not located in the plurality of second caches physically located within the second system includes receiving the lock for the data from the coupling facility lock structure, and
            receiving the indication that that the data is located in the plurality of second caches physically located within the second system includes identifying that the second system is a manager of the lock for the data, where the data is received from the plurality of second caches physically located within the second system in response to calling a contention exit of a current lock manager on the second system, in response to receiving an indication that the data is located in the plurality of second caches physically located within the second system, receiving the data by the first system from the plurality of second caches physically located within the second system, and receiving by the first system the lock for the data in a shared mode;

in response to receiving an indication that the data is not located in the plurality of second caches physically located within the second system, retrieving the data from the first disk drive physically located within the first system;

returning the data to a requesting system that sent the request;

freeing the plurality of first caches physically located within the first system; and releasing the lock for the data by the first system.

2. The computer-implemented method of claim 1, wherein the request for the data is received by the first system in association with a proprietary address space utilized by the first system, the second system, and a plurality of additional systems.

3. The computer-implemented method of claim 1, further comprising returning the data to a requesting system that sent the request, and storing the data within a buffer of one of a plurality of additional systems instead of within the first system in response to determining that the plurality of first caches physically located within the first system have less than a predetermined storage capacity available.

4. The computer-implemented method of claim 1, further comprising sending the request for data to one or more additional systems in response to determining that the first system does not have sufficient resources to handle the request.

5. The computer-implemented method of claim 1, wherein the first system and the second system act together as a single system image, the first system and the second system implement parallel computing, and a communications function implemented between the first system and the second system includes a cross coupling facility (XCF).

6. The computer-implemented method of claim 1, wherein the data is received by the first system utilizing an XCF, in response to determining that the data is located within the one or more caches physically located within the second system.

7. The computer-implemented method of claim 1, wherein the first system and the second system are included within a parallel sysplex.

8. The computer-implemented method of claim 1, further comprising storing the data within the plurality of first caches physically located within the first system after returning the data to a requesting system that sent the request.

9. A computer program product for sharing cached resources, the computer program product comprising a computer readable storage medium having program instructions embodied therewith, wherein the computer readable storage medium is not a transitory signal per se, the program instructions executable by a processor to cause the processor to perform a method comprising:

receiving at a first system, by the processor, a request for data, where the first system includes a first server containing a first central processing unit physically located within the first system, a plurality of first caches physically located within the first system, and a first disk drive physically located within the first system;

searching, by the processor, the plurality of first caches physically located within the first system for the data, where the plurality of first caches include a cache memory location within the first central processing unit and a cache memory location within the first disk drive; and in response to determining that the plurality of first caches physically located within the first system do not contain the data:

identifying, by the processor, a second system physically separate from the first system, where the second system includes a second server, separate from the first server, containing a second central processing unit physically located within the second system, a plurality of second caches physically located within the second system, and a second disk drive physically located within the second system, requesting, by the processor, a lock for the data from a coupling facility lock structure, where:

each lock within the coupling facility lock structure represents a single block of data buffered by the first system, the second system, or another system within a predetermined group of systems, a key associated with each lock includes a data set identifier and a relative block number, and in response to the second system storing a local copy of the data in the plurality of second caches physically located within the second system, the second system obtains the lock until the data is released from the plurality of second caches of the second system, receiving, by the processor, an indication as to whether the second system includes the data in the plurality of second caches physically located within the second system, where the plurality of second caches include a cache memory location within the second central processing unit and a cache memory location within the second disk drive, and where:

receiving the indication that the data is not located in the plurality of second caches physically located within the second system includes receiving the lock for the data from the coupling facility lock structure, and receiving the indication that that the data is located in the plurality of second caches physically located within the second system includes identifying that the second system is a manager of the lock for the data, where the data is received from the plurality of second caches physically located within the second system in response to calling a contention exit of a current lock manager on the second system, in response to receiving an indication that the data is located in the plurality of second caches physically located within the second system, receiving, utilizing the processor, the data by the first system from the plurality of second caches physically located within the second system, and receiving by the first system the lock for the data in a shared mode;

in response to receiving an indication that the data is not located in the plurality of second caches physically located within the second system, retrieving, by the processor, the data from the first disk drive physically located within the first system;

returning, by the processor, the data to a requesting system that sent the request;

freeing, by the processor, the plurality of first caches physically located within the first system; and releasing, by the processor, the lock for the data by the first system.

10. The computer program product of claim 9, wherein the request for the data is received by the first system in association with a proprietary address space utilized by the first system, the second system, and a plurality of additional systems.

11. The computer program product of claim 9, wherein the first system and the second system act together as a single system image, the first system and the second system implement parallel computing, and a communications function implemented between the first system and the second system includes a cross coupling facility (XCF).

12. The computer program product of claim 9, further comprising returning, utilizing the processor, the data to a requesting system that sent the request, and storing, utilizing the processor, the data within a buffer of one of a plurality of additional systems instead of within the first system in response to determining that the plurality of first caches physically located within the first system have less than a predetermined storage capacity available.

13. The computer program product of claim 9, further comprising sending, utilizing the processor, the request for data to one or more additional systems in response to determining that the first system does not have sufficient resources to handle the request.

14. The computer program product of claim 9, wherein the first system and the second system are included within a parallel sysplex.

15. The computer program product of claim 9, further comprising storing, utilizing the processor, the data within the plurality of first caches physically located within the first system after returning the data to a requesting system that sent the request.

16. A system, comprising:
a processor; and
logic integrated with the processor, executable by the processor, or integrated with and executable by the processor, the logic being configured to cause the processor to:
receive, at a first system, a request for data, where the first system includes a first server containing a first central processing unit physically located within the first system, a plurality of first caches physically located within the first system, and a first disk drive physically located within the first system;
search the plurality of first caches physically located within the first system for the data, where the plurality of first caches include a cache memory location within the first central processing unit and a cache memory location within the first disk drive; and
in response to determining that the plurality of first caches physically located within the first system do not contain the data:
identify a second system physically separate from the first system, where the second system includes a second server, separate from the first server, containing a second central processing unit physically located within the second system, a plurality of second caches physically located within the second system, and a second disk drive physically located within the second system,
request a lock for the data from a coupling facility lock structure, where:
each lock within the coupling facility lock structure represents a single block of data buffered by the first system, the second system, or another system within a predetermined group of systems,
a key associated with each lock includes a data set identifier and a relative block number, and
in response to the second system storing a local copy of the data in the plurality of second caches physically located within the second system, the second system obtains the lock until the data is released from the plurality of second caches of the second system,
receive an indication as to whether the second system includes the data in the plurality of second caches physically located within the second system, where the plurality of second caches include a cache memory location within the second central processing unit and a cache memory location within the second disk drive, and where:
receiving the indication that the data is not located in the plurality of second caches physically located within the second system includes receiving the lock for the data from the coupling facility lock structure, and
receiving the indication that that the data is located in the plurality of second caches physically located within the second system includes identifying that the second system is a manager of the lock for the data, where the data is received from the plurality of second caches physically located within the second system in response to calling a contention exit of a current lock manager on the second system,
in response to receiving an indication that the data is located in the plurality of second caches physically located within the second system, receive the data by the first system from the plurality of second caches physically located within the second system, and receive by the first system the lock for the data in a shared mode;
in response to receiving an indication that the data is not located in the plurality of second caches physically located within the second system, retrieve the data from the first disk drive physically located within the first system;
return the data to a requesting system that sent the request;
free the plurality of first caches physically located within the first system; and
release the lock for the data by the first system.

* * * * *